United States Patent
Weller

(10) Patent No.: US 8,574,124 B2
(45) Date of Patent: Nov. 5, 2013

(54) CONTROL UNIT AND METHOD TO OPERATE A VEHICLE

(75) Inventor: Jens Weller, Constance (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 13/564,176

(22) Filed: Aug. 1, 2012

(65) Prior Publication Data

US 2013/0045836 A1 Feb. 21, 2013

(30) Foreign Application Priority Data

Aug. 16, 2011 (DE) .......................... 10 2011 081 005

(51) Int. Cl.
*B60W 10/04* (2006.01)
(52) U.S. Cl.
USPC .......................................................... 477/110
(58) Field of Classification Search
None
See application file for complete search history.

(56) References Cited

U.S. PATENT DOCUMENTS

| | | | | |
|---|---|---|---|---|
| 4,493,228 A | * | 1/1985 | Vukovich et al. | 477/109 |
| 5,313,856 A | * | 5/1994 | Schneider et al. | 477/80 |
| 5,441,464 A | * | 8/1995 | Markyvech | 477/109 |
| 6,080,082 A | * | 6/2000 | Steeby | 477/111 |
| 6,358,183 B1 | * | 3/2002 | Hughes et al. | 477/111 |
| 6,520,889 B1 | * | 2/2003 | Hughes et al. | 477/107 |
| 7,037,238 B2 | * | 5/2006 | Sakamoto et al. | 477/110 |
| 7,086,301 B2 | * | 8/2006 | Sakamoto et al. | 74/335 |
| 7,313,473 B2 | * | 12/2007 | Sakamoto et al. | 701/51 |
| 2009/0280951 A1 | | 11/2009 | Popp et al. | |
| 2012/0135838 A1 | | 5/2012 | Cuppers et al. | |

FOREIGN PATENT DOCUMENTS

DE 10 2008 001 566 A1 11/2009
DE 10 2009 028 305 A1 2/2011

OTHER PUBLICATIONS

German Search Report.

* cited by examiner

*Primary Examiner* — Dirk Wright
(74) *Attorney, Agent, or Firm* — Davis & Bujold, PLLC; Michael J. Bujold

(57) ABSTRACT

A control unit of a motor vehicle for activating a form-locking shift element of a transmission of the motor vehicle in such a way that a defined rotational speed difference is defined, between an input-side component of the form-locking shift element and an output-side component of the form-locking shift element, in order to engage the form-locking shift element. The control unit monitors the rotational speed gradient of the rotational speed of the output-side component of the form-locking shift element from an activation time of the form-locking shift element, at which the engagement process of the form-locking shift element begins. The control unit generates a control signal for a drive assembly in order to increase the torque, at a drive assembly, in the event that the control unit determines that the monitored rotational speed gradient falls below a lower limit.

9 Claims, 1 Drawing Sheet

US 8,574,124 B2

CONTROL UNIT AND METHOD TO OPERATE A VEHICLE

This application claims priority from German patent application serial no. 10 2011 081 005.6 filed Aug. 16, 2011.

FIELD OF THE INVENTION

The invention relates to a control unit of a motor vehicle and a method for operating a motor vehicle.

BACKGROUND OF THE INVENTION

Motor vehicles with transmissions that have form-locking shift elements and/or friction-locking shift elements are known from the practice. For friction-locking shift elements, there can be a relatively large rotational speed difference between an input-side component and an output-side component of a friction-locking shift element when the friction-locking shift element closes, wherein this rotational speed difference can be reduced by friction power at the friction-locking shift element. In contrast, the closing of a form-locking shift element requires that a defined, relatively low rotational speed difference be met between an input-side component and an output-side component of the form-locking shift element. This defined rotational speed difference typically varies between +400 rpm and −400 rpm. Within this rotational speed difference range, safe closing or engaging of a form-locking shift element can be ensured. In contrast, greater rotational speed differences can cause damage to the form-locking shift element. This must be avoided.

From DE 10 2009 028 305 A1, a method for operating a gearbox of a motor vehicle that comprises several friction-locking shift elements and at least one form-locking shift element is known, wherein according to this prior art, a rotational speed difference of the form-locking shift element is determined and a drive torque of the drive assembly is set to a level that keeps the rotational speed difference of the form-locking shift element within a predefined rotational speed range, within which the form-locking shift element has an approximately synchronous state and can be closed.

SUMMARY OF THE INVENTION

Proceeding therefrom, the problem addressed by the present invention is that of creating a novel control unit of a motor vehicle and a novel method for operating a motor vehicle.

This problem is solved by a control unit according to the invention which monitors the rotational speed gradient of the rotational speed of the output-side component of the form-locking shift element from an activation time of the form-locking shift element at which a closing process of the form-locking shift element begins, wherein the control unit generates a control signal for a drive assembly in order to increase the torque at a drive assembly if the control unit determines that the monitored rotational speed gradient falls below a lower limit.

According to the present invention, the control unit monitors the rotational speed gradient of the rotational speed of the output-side component of the form-locking shift element from the activation time of the form-locking shift element at which the closing process of the form-locking shift element begins. If the control unit determines that the monitored output-side rotational speed gradient of the shift element falls below the lower limit, the control device generates a control signal, on the basis of which the torque is increased at the drive assembly.

Therefore, if the control unit determines that the output-side rotational speed gradient of the form-locking shift element drops too much after the form-locking shift element is activated in order to close the form-locking shift element, for example due to braking intervention by the driver or load withdrawal by the driver at the accelerator pedal or gas pedal of the motor vehicle, torque is actively built up at the drive assembly in order to ensure the defined rotational speed difference between the output-side component and the input-side component of the form-locking shift element for closing the form-locking shift element. Thus damage to the form-locking shift element while the form-locking shift element closes can be avoided.

According to an advantageous development of the invention, if the control unit determines that the monitored output-side rotational speed gradient exceeds an upper limit, the control unit generates a control signal for the drive assembly in order to reduce the torque at the drive assembly. Therefore, if the control unit determines that the monitored rotational speed gradient of the form-locking shift element becomes too large, for example as the result of a load build up by the driver at the accelerator pedal or gas pedal of the motor vehicle, the control unit actively limits the torque of the drive assembly to ensure that the defined rotational speed difference between the input-side component and the output-side component of the shift element is present during the closing of the form-locking shift element. The purpose of this is again to safely close the form-locking shift element while avoiding damage to the form-locking shift element.

For this purpose, the control unit preferably generates a signal in order to adapt the torque gradient of the drive assembly. The adaptation of the torque gradient of the drive assembly is especially preferred.

The method according to the invention for operating a motor vehicle is defined below.

BRIEF DESCRIPTION OF THE DRAWINGS

Preferred developments of the invention will become apparent from the description that follows. Example embodiments of the invention are explained in greater detail with reference to the drawings, without being limited thereto. In the drawings.

DETAILED DESCRIPTION OF THE PREFERRED EMBODIMENTS

Figure 1:
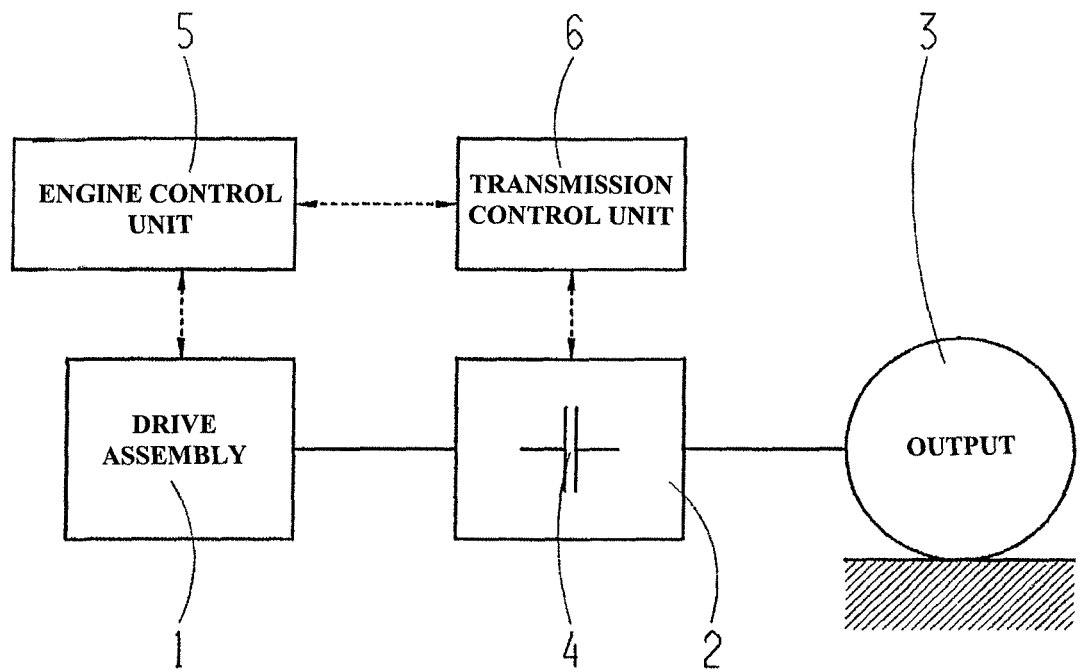
FIG. 1 shows an example schematic of a motor vehicle.

FIG. 1 shows a highly schematized drive train diagram of a motor vehicle. According to FIG. 1, the motor vehicle has a drive assembly 1, a transmission 2, and an output 3, wherein the transmission 2 is connected between the drive assembly 1 and the output 3.

The transmission 2 comprises at least one form-locking shift element 4, which can be designed for example as a claw and which has an input-side component and an output-side component.

FIG. 1 also shows an engine control unit 5 for controlling the operation of the drive assembly 1 in an open-loop or closed-loop manner and a transmission control unit 6 for controlling the operation of the transmission 2 in an open-loop or closed-loop manner. The engine control unit 5 exchanges data with the drive assembly 1 according to the double arrow. Likewise, the transmission control unit 6 exchanges data with the transmission 2. Furthermore, data is exchanged between the engine control unit 5 and the transmission control unit 6.

The present invention relates to a control unit of a motor vehicle and to a method for operating the motor vehicle, wherein the control unit according to the invention is the transmission control unit 6 in particular. The present invention relates to such details by means of which a form-locking shift element 4 of the transmission 2 of the motor vehicle can be safely closed, namely without risk of damage to the form-locking shift element 4.

In order to safely close a form-locking shift element 4 of the transmission 2 without damage, a defined rotational speed difference must be adhered to between the input-side component of the form-locking shift element 4 and the output-side component of the form-locking shift element 4.

Figure 2:
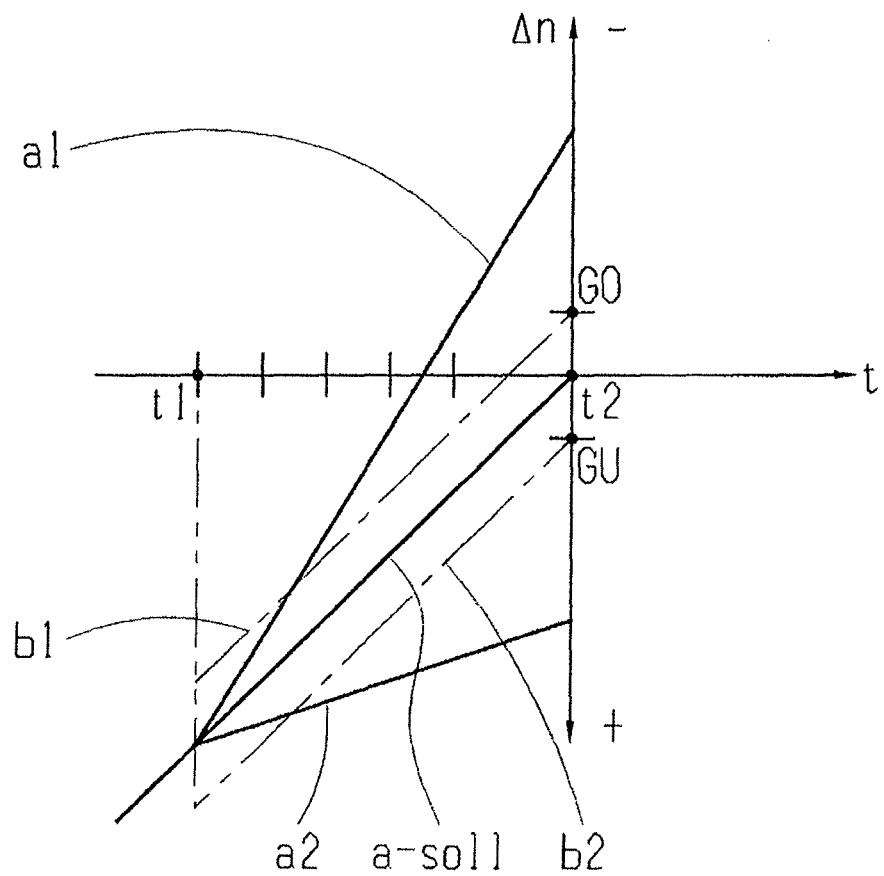
FIG. 2 shows a graph in order to illustrate the invention.

FIG. 2 shows a graph in which the rotational speed difference $\Delta n$ of a form-locking shift element 4 is plotted over time t, wherein the form-locking shift element 4 is activated at time t1. Therefore, a closing process of the form-locking shift element 4 begins at time t1. The form-locking shift element 4 is actually closed at time t2, namely by the engagement of the input-side component and the output-side component of the form-locking shift element 4.

In order to safely close the form-locking shift element 4 without damage at time t2, the rotational speed difference $\Delta n$ should be within a range defined by an upper limit GO and a lower limit GU. If the rotational speed difference $\Delta n$ at time t2 is greater than the upper limit GO or less than the lower limit GU, there is a risk of the form-locking shift element 4 being damaged during closing, i.e., during the engagement of the two components.

According to the invention, the rotational speed gradient a of the rotational speed of the output-side component of the form-locking shift element 4 is monitored starting with the activation of the form-locking shift element 4 at the activation time t1. With the gradient a-SOLL, FIG. 2 shows an ideal rotational speed gradient for the rotational speed of the output-side component of the form-locking shift element 4 that would ensure that there is an optimal rotational speed difference between the input-side component and the output-side component of the form-locking shift element 4 at time t2.

If while monitoring the rotational speed gradient a of the rotational speed of the output-side component of the form-locking shift element 4 the control unit 6 determines that the monitored rotational speed gradient falls below a lower limit b2, as is shown for an example rotational speed gradient a2, the control unit 6 automatically generates a control signal for the drive assembly 1 in order to increase the torque at the drive assembly 1, wherein in the example embodiment shown in FIG. 1, the control unit 6 provides this control signal to the control unit 5 in order to cause the torque increase at the drive assembly 1.

Therefore, if the control unit 6 determines that the output-side rotational speed gradient a of the form-locking shift element 4 drops too much after the form-locking shift element is activated in order to close the form-locking shift element at time t1, for example due to braking intervention by the driver or load withdrawal by the driver at the accelerator pedal or gas pedal of the motor vehicle, a torque is actively built up at the drive assembly 1 in order to ensure the defined rotational speed difference between the output-side component and the input-side component of the form-locking shift element 4 for closing the form-locking shift element 4. Thus damage to the form-locking shift element 4 while the form-locking shift element closes can be avoided.

The control unit 6 actively builds up the torque or load, preferably control unit 6 provides a signal for increasing the torque gradient of the drive assembly 1.

If, in contrast, the control unit 6 determines that the rotational speed gradient a of the rotational speed of the output-side component of the form-locking shift element 4 exceeds an upper limit b1, as is shown in FIG. 2 for the gradient a1 as an example, the control unit 6 generates a control signal for the drive assembly 1 that causes a torque reduction at the drive assembly 1, in particular by reducing the torque gradient of the drive assembly 1.

Therefore, if the control unit 6 determines that the monitored output-side rotational speed gradient a of the form-locking shift element becomes too large after the activation time t1, for example as the result of a load build up by the driver at the accelerator pedal or gas pedal of the motor vehicle, the control unit 6 actively limits the torque of the drive assembly 1 in order to ensure that the defined rotational speed difference between the input-side component and the output-side component of the shift element 4 is present when closing the form-locking shift element 4.

By means of the present invention, a relatively low rotational speed difference between the two components of the form-locking shift element 4 can be ensured in a simple manner at time t2, at which the these components engage, so that there is no risk of damage to the form-locking shift element 4.

Reference Characters

1 Drive assembly
2 Transmission
3 Output
4 Shift element
5 Engine control unit
6 Transmission control unit

The invention claimed is:

1. A control unit of a motor vehicle for activating a form-locking shift element of a transmission of the motor vehicle such that a defined rotational speed difference, between an input-side component and an output-side component of the form-locking shift element, is established in order to close the form-locking shift element,
  the control unit monitors a rotational speed gradient of the rotational speed of the output-side component of the form-locking shift element from an activation time of the form-locking shift element at which an engaging process of the form-locking shift element begins, and
  the control unit generating a control signal for a drive assembly to increase torque at a drive assembly when the control unit determines that the monitored rotational speed gradient falls below a lower limit.

2. The control unit according to claim 1, wherein the control unit generates a signal to increase the torque gradient of the drive assembly.

3. The control unit according to claim 1, wherein the control unit generates a control signal for a drive assembly to reduce the torque, at the drive assembly, when the control unit determines that the monitored rotational speed gradient exceeds an upper limit.

4. The control unit according to claim 3, wherein the control unit generates a signal in order to reduce the torque gradient of the drive assembly.

5. The control unit according to claim 1, wherein the control unit is a transmission control unit.

6. A method of operating a motor vehicle having a drive assembly and a transmission comprising at least one form-locking shift element, the method comprising the steps of:
monitoring a rotational speed gradient of a rotational speed of an output-side component of the form-locking shift element from an activation time of the form-locking shift element, at which an engaging process of the form-locking shift element begins, and
generating a control signal for a drive assembly to increase torque at a drive assembly upon determining that the monitored rotational speed gradient falls below a lower limit.

7. The method according to claim 6, further comprising the step of generating a control signal for the drive assembly to the reduce the torque at the drive assembly upon determining that the monitored rotational speed gradient exceeds an upper limit.

8. The method according to claim 6, further comprising the step of generating a signal to adapt the torque gradient of the drive assembly.

9. A method of operating a motor vehicle having a drive assembly and a transmission comprising at least one form-locking shift element having an input side component and an output side component, the method comprising the steps of:
monitoring, with a control unit, a rotational speed gradient of the output side component of the form-locking shift element commencing at a time when the form-locking shift element is activated to commence an engaging process;
determining, with the control unit, a value of the rotational speed gradient;
comparing the value of the rotational speed gradient with a defined rotational speed range;
generating a drive assembly control signal for increasing torque produced by the drive assembly upon determining that the rotational speed gradient is below a lower limit; and
generating a drive assembly control signal for reducing the torque produced by the drive assembly upon determining the rotational speed gradient is above an upper limit.

* * * * *